(12) United States Patent
Benedictus et al.

(10) Patent No.: US 7,604,704 B2
(45) Date of Patent: Oct. 20, 2009

(54) BALANCED AL-CU-MG-SI ALLOY PRODUCT

(75) Inventors: Rinze Benedictus, Delft (NL);
Christian Joachim Keidel, Montabaur (DE); Alfred Ludwig Heinz, Niederahr (DE); Alfred Johann Peter Haszler, Vallendar (DE)

(73) Assignee: Aleris Aluminum Koblenz GmbH, Koblenz (DE)

( * ) Notice: Subject to any disclaimer, the term of this patent is extended or adjusted under 35 U.S.C. 154(b) by 0 days.

(21) Appl. No.: 10/642,518

(22) Filed: Aug. 18, 2003

(65) Prior Publication Data

US 2004/0112480 A1    Jun. 17, 2004

(30) Foreign Application Priority Data

Aug. 20, 2002    (EP)    ................... 02078444

(51) Int. Cl.
*C22F 1/04* (2006.01)
*C22C 21/12* (2006.01)

(52) U.S. Cl. ........................ 148/693; 148/417

(58) Field of Classification Search ............ 148/693, 148/417
See application file for complete search history.

(56) References Cited

U.S. PATENT DOCUMENTS

| | | | |
|---|---|---|---|
| 3,826,688 A | 7/1974 | Levy | |
| 4,294,625 A | 10/1981 | Hyatt et al. | |
| 4,336,075 A | 6/1982 | Quist et al. | |
| 5,213,639 A | 5/1993 | Colvin et al. | |
| 5,376,192 A | 12/1994 | Cassada, III | |
| 5,593,516 A * | 1/1997 | Cassada, III | 148/418 |
| 5,620,652 A * | 4/1997 | Tack et al. | 420/532 |
| 5,759,302 A | 6/1998 | Nakai et al. | |
| 5,863,359 A | 1/1999 | Karabin et al. | |
| 5,865,914 A | 2/1999 | Karabin et al. | |
| 5,879,475 A | 3/1999 | Karabin | |
| 5,897,720 A | 4/1999 | Dorward | |
| 5,938,867 A | 8/1999 | Dorward et al. | |
| 6,077,363 A | 6/2000 | Heymes et al. | |
| 6,277,219 B1 | 8/2001 | Heinz et al. | |
| 6,325,869 B1 | 12/2001 | Liu et al. | |
| 6,562,154 B1 | 5/2003 | Rioja et al. | |
| 6,569,542 B2 | 5/2003 | Warner et al. | |
| 6,602,361 B2 | 8/2003 | Warner et al. | |
| 6,974,633 B2 | 12/2005 | Garatt et al. | |
| 7,323,068 B2 | 1/2008 | Benedictus et al. | |
| 7,494,552 B2 | 2/2009 | Benedictus et al. | |
| 2002/0031681 A1 | 3/2002 | Heinz et al. | |
| 2003/0070734 A1 | 4/2003 | Heinz et al. | |
| 2003/0104990 A1 | 6/2003 | Hauer et al. | |
| 2003/0140990 A1 | 7/2003 | Ribes et al. | |
| 2004/0060618 A1 | 4/2004 | Benedictus et al. | |
| 2004/0079455 A1* | 4/2004 | Dif et al. | 148/552 |
| 2004/0099353 A1* | 5/2004 | Benedictus et al. | 148/552 |
| 2008/0121317 A1 | 5/2008 | Benedictus et al. | |

FOREIGN PATENT DOCUMENTS

| | | |
|---|---|---|
| EP | 0473122 | 3/1992 |
| EP | 489408 | 6/1992 |
| EP | 723033 | 7/1996 |
| EP | 0731185 | 9/1996 |
| EP | 0989195 | 3/2000 |
| EP | 1114877 | 7/2001 |
| EP | 1170394 | 1/2002 |
| EP | 1026270 | 2/2002 |
| EP | 1045043 | 10/2002 |
| FR | 2789405 | 8/2000 |
| GB | 2352453 | 1/2001 |
| JP | 60067636 | 4/1985 |
| JP | 60251260 | 12/1985 |
| JP | 7252574 | 3/1995 |
| JP | 07252574 | 10/1995 |
| JP | 10017976 | 1/1998 |
| WO | 0037702 | 6/2000 |
| WO | 2004018723 | 3/2004 |

OTHER PUBLICATIONS

"Metals Handbook: Desk Edition", 2nd ed., ASM International, 1998, p. 445-446.*
Office Action, Aug. 9, 2005, for U.S. Appl. No. 10/642,507.
Office Action, Sep. 20, 2006, for U.S. Appl. No. 10/642,507.
Office Action, Mar. 22, 2007, for U.S. Appl. No. 10/642,507.
Office Action, Aug. 9, 2005, for U.S. Appl. No. 10/639,776.
Office Action, Jul. 25, 2006, for U.S. Appl. No. 10/639,776.
Office Action, Feb. 20, 2007, for U.S. Appl. No. 10/639,776.
Office Action, Jul. 26, 2007, for U.S. Appl. No. 10/639,776.
Office Action, Dec. 28, 2007, for U.S. Appl. No. 10/639,776.
Metals Handbook Desk Edition, ASM International, 1999, p. 1037.
ASM Specialty Handbook, Aluminum and Aluminum Alloys, p. 29-30 (1993).
New Materials for Next-Generation Commercial Transports, National Materials Advisory Board, National Academy Press, p. 26 (1996).

(Continued)

*Primary Examiner*—Roy King
*Assistant Examiner*—Jessee R. Roe
(74) *Attorney, Agent, or Firm*—Novak Druce + Quigg LLP

(57) ABSTRACT

The present invention concerns a balanced Al—Cu—Mg—Si alloy having a high toughness, good strength levels and an improved fatigue crack growth resistance, comprising essentially the following composition (in weight percent): Cu: 3.6-4.9, Mg: 1.0-1.8, Mn:≦0.50, preferably <0.30, Si: 0.10-0.40, Zr:≦0.15, Cr:≦0.15, Fe:≦0.10, the balance essentially aluminum and incidental elements and impurities. There is also disclosed a method for producing the balanced Al—Cu—Mg—Si alloy product having a high toughness and an improved fatigue crack growth resistance, and applications of that product as a structural member of an aircraft.

32 Claims, No Drawings

OTHER PUBLICATIONS

Davis, J.R., "ASM Specialty Handbook—Aluminium and Aluminium Alloys", ASM International, p. 63-64 (1993).

Davis, J.R., "ASM Specialty Handbook—Aluminium and Aluminium Alloys", ASM International, Paper No. XP-002266795, p. 20 (1996).

N. Ridlev and J. Pilling, "Superplastic deformation characteristics of some commercial aluminium alloys", Aluminium Technology, London, Book 3, Session B, pp. 44.1-44.7 (Mar. 1986).

Davis, J.R., ASM Specialty Handbook, "Aluminium-Lithium Alloys", p. 121 (May, 1994).

Davis, J.R., ASM Specialty Handbook, "Aluminium and Aluminium Alloys", pp. 143-147 (1993).

"ASM Handbook: vol. 2 Properties and Selection: Nonferrous Alloys and Special-Purpose Materials", ASM International, pp. 70-79 (1990).

"ASM Handbook: vol. 9 Metallography and Microstructures", ASM International, pp. 364-365 (1985).

Office action, Jan. 11, 2005 for U.S. Appl. No. 10/642,507.

Office action, Jan. 12, 2005 for U.S. Appl. No. 10/639,776.

Office action, Nov. 1, 2004 for U.S. Appl. No. 09/876,233.

Office action, Oct. 6, 2004 for U.S. Appl. No. 10/195,483.

ASTM E112-96, Standard Test Methods for Determining Average Grain Size (1996).

Machine translation of JP-H10-17976.

J.R. Davis, "Metals Handbook-Desk Edition", p. 427 (2000).

* cited by examiner

BALANCED AL-CU-MG-SI ALLOY PRODUCT

FIELD OF THE INVENTION

The present invention relates to a balanced Al—Cu—Mg—Si alloy having a high toughness and an improved fatigue crack growth resistance, while maintaining good strength levels, to a method for producing a balanced Al—Cu—Mg—Si alloy having a high toughness, good strength levels and an improved fatigue crack growth resistance, and to a rolled alloy sheet product for aerospace applications. More specifically, the present invention relates to a balanced Al—Cu—Mg—Si alloy designated by the AA2xxx-series for structural aeronautical applications with improved properties such as fatigue crack growth resistance, strength and fracture toughness. The invention also relates to a rolled alloy product suited to be used as fuselage skin or lower wing skin of an aircraft.

BACKGROUND OF THE INVENTION

It is known in the art to use heat treatable aluminum alloys in a number of applications involving relatively high strength such as aircraft fuselages, vehicular members and other applications. Aluminum Association alloys ("AA")2×24, such as AA2024, AA2324 and AA2524 are well known heat treatable aluminum alloys which have useful strength and toughness properties in T3, T39 and T351 tempers.

The design of a commercial aircraft requires various properties for different types of structures on the aircraft. Especially for fuselage skin or lower wing skin it is necessary to have properties such as good resistance to crack propagation either in the form of fracture toughness or fatigue crack growth. At the same time the strength of the alloy should not be reduced. A rolled alloy product either used as a sheet or as a plate with an improved damage tolerance will improve the safety of the passengers, will reduce the weight of the aircraft and thereby improve the fuel economy which translates to a longer flight range, lower costs and less frequent maintenance intervals.

It is known in the art to have AA2×24 alloy compositions with the following broad compositional range, in weight percent:

| | |
|---|---|
| Cu: | 3.7-4.4 |
| Mg: | 1.2-1.8 |
| Mn: | 0.15-0.9 |
| Cr: | 0.05-0.10 |
| Si: | ≤0.50 |
| Fe: | ≤0.50 |
| Zn: | ≤0.25 |
| Ti: | ≤0.15 | the balance aluminum and incidental impurities. Over time narrower windows have been developed within the broad 2024-series alloy range, in particular concerning lower combined Si and Fe ranges to improve on specific engineering properties.

U.S. Pat. No. 5,593,516 discloses a high damage tolerant Al—Cu alloy with a balanced chemistry comprising essentially the following composition (in weight %):

| | |
|---|---|
| Cu: | 2.5-5.5 |
| Mg: | 0.1-2.3 |
| $Cu_{max}$ | $-0.91\ Mg + 5.59$ |
| $Cu_{min}$ | $-0.91\ Mg + 4.59$ |
| Zr: | up to 0.2, or |
| Mn: | up to 0.8 | balance aluminum and unavoidable impurities. It also discloses T6 and T8 tempers of such alloys which gives high strength to a rolled product made of such alloy.

U.S. Pat. No. 5,897,720 discloses a high damage tolerant Al—Cu alloy with a "2024"-chemistry comprising essentially the following composition (in weight %):

| | |
|---|---|
| Cu: | 3.8-4.9 |
| Mg: | 1.2-1.8 |
| Mn: | 0.3-0.9 |
| Si: | <0.30, preferably <0.12 |
| Fe: | <0.30, preferably <0.08 |
| Ti: | <0.15, preferably <0.06 | the balance aluminum and unavoidable impurities wherein the alloy is annealed after hot rolling at a temperature at which the intermetallics do not substantially dissolve. The annealing temperature is between 398° C. and 455° C.

JP-A-07252574 discloses a method of manufacturing an Al—Cu—Mg alloy comprising the steps of hot rolling after continuous casting and specifying the cooling rate at the time of solidification. In order to benefit from the high cooling rates in the continuous casting operation the contents of Fe and Si are controlled such that the sum of Fe+Si exceeds as least 0.4 wt. %.

U.S. Pat. No. 5,938,867 discloses a high damage tolerant Al—Cu alloy with a "2024"-chemistry comprising essentially the following composition (in weight %):

| | |
|---|---|
| Cu: | 3.8-4.9 |
| Mg: | 1.2-1.8 |
| Mn: | 0.3-0.9 | balance aluminum and unavoidable impurities wherein the ingot is inter-annealed after hot rolling with an anneal temperature of between 385° C. and 468° C.

EP-0473122, as well as U.S. Pat. No. 5,213,639, disclose an aluminum base alloy comprising essentially the following composition (in weight %):

| | |
|---|---|
| Cu: | 3.8-4.5, preferably 4.0-4.5 |
| Mg: | 1.2-1.8, preferably 1.2-1.5 |
| Mn: | 0.3-0.9, preferably 0.4-0.7 |
| Fe: | ≤0.12, preferably max. 0.1 |
| Si: | ≤0.10 | the remainder aluminum, incidental elements and impurities, wherein such aluminum base is hot rolled, heated to above 910° F. to dissolve soluble constituents, and again hot rolled, thereby obtaining good combinations of strength together with high fracture toughness and a low fatigue crack growth rate. More specifically, U.S. Pat. No. 5,213,639 discloses a required inter-anneal treatment after hot rolling the cast ingot within a temperature range of 479° C. to 524° C. and again hot rolling the inter-annealed alloy wherein the alloy may contain optionally one or more elements from the group consisting of:

| | |
|---|---|
| Cr: | 0.02-0.40 |
| V: | 0.01-0.5 |
| Hf: | 0.01-0.40 |
| Cr: | 0.01-0.20 |
| Ag: | 0.01-1.00 |
| Sc: | 0.01-0.50. |

Such alloy appear to show a 5% improvement over the above mentioned conventional 2024-alloy in T-L fracture toughness and an improved fatigue crack growth resistance at certain ΔK-levels.

EP-1170394-A2 discloses an aluminum sheet product with improved fatigue crack growth resistance having an anisotropic microstructure defined by grains having an average length to width aspect ratio of greater than about 4 and comprising essentially the following composition (in weight %):

| | |
|---|---|
| Cu: | 3.5-4.5 |
| Mg: | 0.6-1.6 |
| Mn: | 0.3-0.7 |
| Zr: | 0.08-0.13 | the remainder substantially aluminum, incidental elements and impurities. The examples show a Si-level in the range of 0.02 to 0.04 while maintaining a Cu-level of more than 3.0. Furthermore it is disclosed an Al—Mg—Si alloy (AA6xxx series) with Si levels between 0.10 and 2.50 but Cu levels below 2.0 and an Al—Mg alloy (AA5xxx series) with Si levels of up to 0.50 but Cu levels below 1.5. The first mentioned alloy has an improvement in compressive yield strength property achieved by respective sheet products in comparison with conventional 2524-sheet products. Furthermore, the strength and toughness combinations of such sheet products with high Mn variants have been described to be better than those of 2524-T3. Throughout the high anisotropy in grain structure the fatigue crack growth resistance could be improved.

Furthermore, it is described that low copper-high manganese samples exhibited higher properties than high copper-low manganese samples. Results from tensile strength measurements showed that high manganese variants exhibited higher strength values than the low manganese variants. The strengthening effect of manganese was reported to be surprisingly higher than that of copper.

SUMMARY OF THE INVENTION

It is a preferred object of the present invention to provide a balanced 2xxx-alloy having a high toughness and an improved fatigue crack growth resistance while maintaining good strength levels of conventional 2024, 2324 or 2524 alloys. It is a further object of the present invention to provide aluminum alloy sheet products having an improved fracture toughness and resistance to fatigue crack growth for aircraft applications such as fuselage skin or lower-wing skin.

Yet a further object of the present invention is to provide rolled aluminum alloy sheet products and a method for producing those products so as to provide structural members for aircrafts which have an increased resistance to fatigue crack growth and to provide an improved fracture toughness while still maintaining high levels of strength.

More specifically, there is a general requirement for rolled 2xxx-series aluminum alloys within the range of 2024 and 2524 alloys when used for aeronautical applications that the fatigue crack growth rate ("FCGR") should not be greater than a defined maximum. A FCGR which meets the requirements of high damage tolerance 2024-series alloy products is e.g. FCGR below 0.001 mm/cycles at $\Delta K=20$ MPa$\sqrt{m}$ and 0.01 mm/cycles at $\Delta K=40$ MPa$\sqrt{m}$. At the same time the tensile yield strength (or proof strength) and ultimate tensile strength should not be lowered, e.g. $R_p$ not lowered below e.g. 310 MPa and $R_m$ not lowered below e.g. 430 MPa in the L-direction.

The present invention preferably solves one or more of the above-mentioned objects.

DETAILED DESCRIPTION OF THE PREFERRED EMBODIMENTS

In accordance with the invention there is disclosed a balanced Al—Cu—Mg—Si alloy having a high toughness, good strength levels and an improved fatigue crack growth resistance, comprising the following composition (in weight percent):

| | |
|---|---|
| Cu: | 3.6-4.9 |
| Mg: | 1.0-1.8 |
| Mn: | <0.30 |
| Si: | 0.10-0.40 |
| Zr: | ≦0.15 |
| Cr: | ≦0.15 |
| Fe: | ≦0.10, | the balance essentially aluminum and incidental elements and impurities, which are typically each <0.05, and total <0.15.

It has surprisingly been found that lower levels of manganese result in a high toughness and an improved fatigue crack growth resistance specifically in areas where the toughness and fatigue crack growth resistance under tensile load are critical. Surprisingly, the alloy of the instant invention in the T3 temper, more specifically in the T351 temper, has a significant improved toughness by lowering the amount of manganese. Furthermore, it has been found that by increasing the amount of Si it is possible to achieve strength levels comparable with strength levels of conventional AA2×24 alloys. Furthermore, it has been found that by increasing the Si content improved FCGR performance is obtained. The Si content is increased to levels above those used in current aerospace grade materials, viz. typically <0.10, and preferably <0.07 wt.%.

More specifically, it has been found that a reduction of the manganese level and by increasing the silicon level the fatigue crack growth resistance of the alloy could be enhanced by up to 90% compared to a conventional 2024 alloy and up to approximately 65% compared to a conventional 2024 alloy if the strength levels are maintained. In that case even the toughness was improved compared to the toughness of conventional 2024 alloys. By lowering the level of manganese toughness as well as fatigue crack growth resistance was increased wherein the strength levels decreased. By also increasing the level of silicon the strength level increased again without lowering the toughness to unacceptable levels.

The amount (in weight %) of manganese is preferably in a range of up to 0.10, most preferably in the range of incidental elements and impurities. That means that the amount of manganese should be 0 or at least neglectable.

The amount (in weight %) of copper is preferably in a range of 3.9 to 4.6, most preferably in a range of 4.3 to 4.5. Copper is an important element for adding strength to the alloy. It has been found that a copper content of about 4.4 results in a good compromise in strength, toughness, formability and corrosion performance while still resulting in sufficient damage tolerance properties.

The preferred amount (in weight %) of magnesium is in a range of 1.2 to 1.7, most preferably in a range of 1.5 to 1.7. Magnesium also provides strength to the alloy product.

The amount (in weight %) of silicon is more preferably in a range of 0.23 to 0.30, even more preferably in a range of 0.23 to 0.28, and most preferably in a range of about 0.25. While prior art AA2xxx-series alloys attempt to avoid silicon since it is considered to be a detrimental impurity element, the present invention uses silicon deliberately to increase the strength level of alloys having a low Mn-content and which are preferably substantially manganese-free. In accordance with the invention it has been found that the casting technique is important to benefit from the somewhat increased Si-content in combination with the low Mn-content.

Another preferred specific alloy according to the present invention comprises about 4.4% copper, about 1.68% manganese, about 0.25% silicon and no manganese (except as an inevitable impurity).

Furthermore, the alloy of the present invention may preferably further comprise one or more of the elements Zn, Ag, Hf, V, Sc, Ti or Li, the total amount less than 1.00 (in weight %). The alloy of the present invention is either un-recrystallized or recrystallized or a combination thereof.

A method for producing a balanced Al—Cu—Mg—Si alloy as set out above and having a high toughness, good strength levels and an improved fatigue crack growth resistance according to the invention comprises the steps of:

a) casting a rolling ingot with the following composition (in weight percent):

| | |
|---|---|
| Cu: | 3.6-4.9 |
| Mg: | 1.0-1.8 |
| Mn: | <0.30 |
| Si: | 0.10-0.40, preferably 0.15 to 0.35 |
| Zr: | ≦0.15 |
| Cr: | ≦0.15 |
| Fe: | ≦0.10, | the balance essentially aluminum and incidental elements and impurities, wherein the ingot is cast by semi-continuous direct chill (DC) casting;
b) homogenizing and/or pre-heating the ingot after casting;
c) hot rolling the ingot and optionally cold rolling into a rolled product;
d) solution heat treating (SHT);
e) quenching the heat treated product;
f) stretching the quenched product; and
g) naturally ageing the rolled and solution heat treated and quenched product.

After hot rolling the ingot it is possible to anneal and/or reheat the hot rolled ingot and further hot rolling the rolled ingot. It is furthermore possible to conduct a heat treatment between hot rolling and cold rolling at the same temperatures and times as during homogenization, e.g. 1 to 5 hours at 460° C. and about 24 hours at 490° C. The hot rolled ingot is preferably inter-annealed before and/or during cold rolling to enhance the ordering of the grains. Such inter-annealing is preferably done at a gauge of about 2.0 mm for 1 hour at 350° C. Furthermore, it is advisable to stretch the rolled and heat treated product in a range of up to 3%, and preferably in a range of 1-2%, and then naturally ageing the stretched product for more than 10 days, preferably about 10 to 20 days to achieve a T3 or T351 temper condition.

The present invention furthermore provides a rolled balanced Al—Cu—Mg—Si alloy sheet product having an improved fatigue crack growth resistance with an alloy composition as described above. Such rolled alloy sheet product has preferably a gauge of about 2.0 mm to 12 mm for applications such as for fuselage skin and about 25 mm to 50 mm for applications such as lower wing skin of an aircraft. The present invention thereby provides an aircraft fuselage sheet or an aircraft lower-wing member sheet with improved fatigue crack growth resistance by maintaining good strength levels.

The foregoing and other features and advantages of the alloy product according to the invention will become readily apparent from the following detailed description of two preferred examples.

EXAMPLE

On an industrial scale four different aluminum alloys have been cast into ingots having the following chemical composition as set out in Table 1, wherein the first two alloys are reference-alloys as designated by AA2024 and AA2524 respectively.

The alloys have been processed to a final gauge of 2.00 mm sheet in the T351 temper. The DC-cast ingots were homogenized at about 490° C. for about 24 hours, then hot rolled at 410° C. The plates were further cold rolled, surface heat treated and stretched by about 1%. All alloys have been tested at least after 10 days of natural ageing.

Then, the tensile yield strength (PS) and ultimate tensile strength (UTS) properties were tested in the L-direction. Additionally, the notch toughness (TS/$R_p$) was tested in the T-L-direction. The testing was done in accordance with ASTM-B871 (1996) for the Kahn tear tests, and EN-10.002 for the tensile tests.

TABLE 1

Chemical composition of the DC-cast aluminum alloys, in weight %, Fe about 0.06%, balance aluminum and inevitable impurities.

| Alloy | Cu | Mn | Mg | Zr | Si |
|---|---|---|---|---|---|
| AA2024 | 4.4 | 0.59 | 1.51 | 0 | 0.05 |
| AA2524 | 4.3 | 0.51 | 1.39 | 0 | 0.05 |
| 1 | 4.4 | 0 | 1.68 | 0 | 0.25 |
| 2 | 4.4 | 0 | 1.61 | 0 | 0.11 |

TABLE 2

Tensile properties and notch toughness of alloys 1 to 4 of Table 1 in the L and T-L direction.

| | L | | T-L |
|---|---|---|---|
| Alloy | PS (MPa) | UTS (MPa) | TS/Rp |
| AA2024 | 344 | 465 | 1.74 |
| AA2524 | 338 | 447 | 1.99 |
| 1 | 325 | 451 | 1.97 |
| 2 | 310 | 458 | 2.09 |

As identified in Table 2 the notch toughness of the alloys 1 and 2 is about equal and better than that of conventional 2024/2524 alloys. The substantially manganese-free alloys showed a very good toughness. By adding silicon (alloy 1) to levels above those currently used for aerospace grade aluminum alloy products, the tensile yield strength level increases without lowering the toughness and ultimate tensile strength level to an acceptable level.

In order to identify the fatigue crack growth rate ("FCGR") all alloys were tested according to ASTM E647 on 80 mm wide M(T) panels at R=0.1 at constant load and at a frequency of 8 Hz. The lifetime as shown in Table 3 is defined as the time (in number of cycles) that the crack grows from a length of 5 mm to 20 mm. The maximum stress was 54 MPa. The initial notch was 4.1 mm. Anti-buckling device are not used. The results are shown in Table 3.

TABLE 3

Fatigue crack growth rate for all alloys compared with commercially available AA2024 alloy (=baseline).

| Alloy | Cycles between a = 5 and 20 mm | Improvement in lifetime over AA2024 |
|---|---|---|
| AA2024 | 170,694 | baseline |
| AA2524 | 216,598 | 27% |
| 1 | 283,876 | 66% |
| 2 | 322,940 | 89% |

From the results of Table 3 it is clear that the lifetime is the better the lower the level manganese is. By adding silicon the strength levels (as shown in Table 2) increase again while the improvement in lifetime is still considerably high. That means that the improvement in fatigue crack growth rate is significantly higher when manganese levels are low, more or less independent of the level of silicon. That means that those alloys, especially at lower $\Delta K$-values, have a significant longer lifetime and therefore are very useful for aeronautical applications.

Having now fully described the invention, it will be apparent to one of ordinary skill in the art that many changes and modifications can be made without departing from the spirit and scope of the invention as hereon described.

The invention claimed is:

1. A method of producing a balanced Al—Cu—Mg—Si alloy having a high toughness, good strength levels and an improved fatigue crack growth resistance, comprising the steps of:
   a) casting an ingot consisting of the following composition (in weight percent):
      Cu: 4.3-4.9
      Mg: 1.5-1.8
      Si: 0.10-0.40
      Cr: $\leq 0.15$
      $0 < Fe \leq 0.10$,
      the balance essentially aluminum and incidental elements and impurities, which are at most 0.05% per element, 0.15% total, wherein the ingot is cast by semi-continuous direct chill (DC) casting,
   b) homogenizing and/or pre-heating the ingot after the casting step,
   c) hot rolling the homogenized and/or pre-heated ingot and optionally cold rolling into a rolled product,
   d) solution heat treating the hot rolled product,
   e) quenching the solution heat treated product,
   f) stretching the quenched product, and
   g) naturally ageing the stretched, rolled and heat-treated product.

2. Method according to claim 1, wherein, after hot rolling the ingot, annealing and/or reheating the hot rolled ingot and further hot rolling the rolled ingot.

3. Method according to claim 1, wherein said hot rolled ingot is inter-annealed before and/or during cold rolling.

4. Method according to claim 1, wherein said rolled and heat-treated product is stretched in a range of up to 3% and naturally aged for more than 10 days.

5. Method according to claim 1, wherein the rolled and heat-treated product is stretched in a range of 1 to 2%.

6. Method according to claim 1, wherein the rolled and heat-treated product is, after stretching, naturally aged for a period in a range of 10 to 20 days.

7. Method according to claim 1, wherein the alloy product has been processed to an alloy product in a T3 or T351 temper condition.

8. Method according to claim 1, wherein the alloy product has been processed to a sheet product having a final thickness in a range of 2.0 to 12 mm.

9. Method according to claim 1, wherein the alloy product has been processed to a sheet product having a final thickness in a range of 25 to 50 mm.

10. Method according to claim 1, wherein the alloy product has been processed to a structural member of an aircraft or spaceship.

11. Method according to claim 1, wherein the alloy product has been processed to a fuselage skin of an aircraft.

12. Method according to claim 1, wherein the alloy product has been processed to a lower-wing member of an aircraft.

13. Method according to claim 1, wherein the amount (in weight %) of Cu in the alloy is in a range of 4.3 to 4.6%.

14. Method according to claim 1, wherein the amount (in weight %) of Cu in the alloy is in a range of 4.4 to 4.5%.

15. Method according to claim 1, wherein the amount (in weight %) of Mg in the alloy is in a range of 1.5 to 1.7% and the amount (in weight %) of Cu in the alloy is in a range of 4.4-4.9.

16. Method according to claim 1, wherein the amount (in weight %) of Mg in the alloy is in a range of 1.5 to 1.7%.

17. Method according to claim 1, wherein the amount (in weight %) of Si in the alloy is in a range of 0.15 to 0.35%.

18. Method according to claim 1, wherein the amount (in weight %) of Si in the alloy is in a range of 0.23 to 0.30%.

19. Method according to claim 1, wherein the amount (in weight %) of Si in the alloy is in a range of 0.23 to 0.28%.

20. Method according to claim 1, wherein the alloy product has been processed to a product having a fatigue crack growth rate of less than 0.001 mm/cycles at $\Delta K=20$ MPa$\sqrt{m}$ when tested according to ASTM-E647 on 80 mm wide M(T) panels at R=0.1 at constant load and at a frequency of 8 Hz.

21. Method according to claim 1, wherein the alloy product has been processed to a product having a fatigue crack growth rate of less than 0.01 mm/cycles at $\Delta K=20$ MPa$\sqrt{m}$ when tested according to ASTM-E647 on 80 mm wide M(T) panels at R=0.1 at constant load and at a frequency of 8 Hz.

22. Method according to claim 1, wherein the alloy product has been processed to a product having a tensile yield strength of not less than 310 MPa in the L-direction.

23. Method according to claim 1, wherein the alloy product has been processed to a product having an ultimate tensile strength in the L-direction of not less than 430 MPa.

24. Method according to claim 1, wherein the amount of Fe in the alloy is 0.06-0.10%.

25. Method according to claim 1, wherein the amount of Mn is 0.

26. Method according to claim 1, wherein the amount of Fe in the alloy is 0.06-0.10% and the amount of Mn is 0.

27. Method according to claim 1, wherein the amount of Mg in the alloy is 1.68-1.8%.

28. Method according to claim 1, wherein in the alloy the amount of Cu is 4.3 to 4.5%, the amount of Mn is 0, the amount of Mg is 1.6-1.7%, the amount of Si is 0.10 to 0.25%, and the amount of Fe is 0.06-0.10%.

29. Method according to claim 1, wherein the alloy consists of 4.3 to 4.5% Cu, 1.6 to 1.7% Mg, 0.23 to 0.30% Si, and 0.06-0.10% Fe, the balance essentially aluminum and incidental elements and impurities, which are at most 0.05% per element, 0.15% total.

30. Method according to claim 1, wherein the amount of Mg in the alloy is 1.68-1.8% and amount of Cu is 4.4-4.9.

31. Method according to claim 1, wherein in the alloy the amount of Cu is 4.3 to 4.5%, the amount of Mn is 0, the amount of Mg is 1.6 to 1.7%, the amount of Si is 0.23 to 0.30%, and the amount of Fe is 0.06-0.10%.

32. Method according to claim 31, wherein in the alloy the amount of Cu is 4.4 to 4.5%, the amount of Mn is 0, the amount of Mg is 1.6 to 1.7%, the amount of Si is 0.23 to 0.30%, and the amount of Fe is 0.06-0.10%,
wherein the alloy product has been processed to a product having:
a fatigue crack growth rate of less than 0.01 mm/cycles at $\Delta K=20$ MPa$\sqrt{m}$ when tested according to ASTM-E647 on 80 mm wide M(T) panels at R=0.1 at constant load and at a frequency of 8 Hz;
a tensile yield strength of not less than 310 MPa in the L-direction; and
an ultimate tensile strength in the L-direction of not less than 430 MPa,
wherein the alloy product has been processed to an alloy product in a T3 or T351 temper condition.

* * * * *